April 22, 1930.   C. H. GUNN   1,755,540
CONTROLLABLE AUXILIARY WING FOR AIRPLANES
Filed Sept. 19, 1928   2 Sheets-Sheet 1

INVENTOR
Charles H. Gunn
BY
ATTORNEY

April 22, 1930. C. H. GUNN 1,755,540
CONTROLLABLE AUXILIARY WING FOR AIRPLANES
Filed Sept. 19, 1928  2 Sheets-Sheet 2
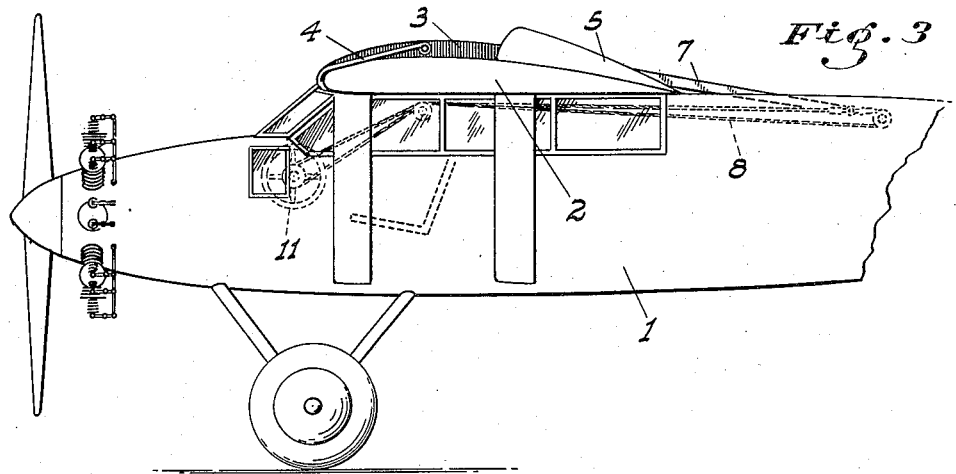
Fig. 3
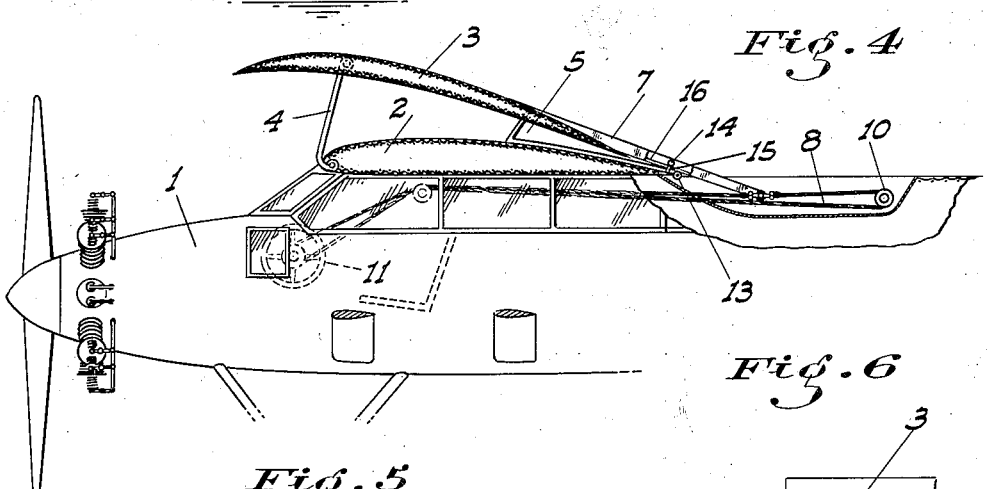
Fig. 4
Fig. 6
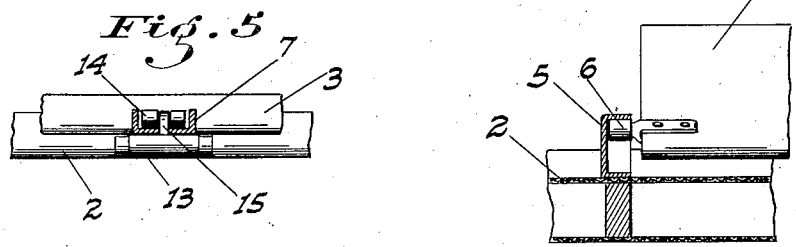
Fig. 5
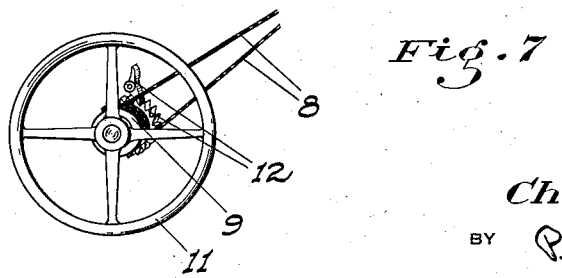
Fig. 7
INVENTOR
Charles H. Gunn
BY
ATTORNEY Patented Apr. 22, 1930

1,755,540

UNITED STATES PATENT OFFICE

CHARLES H. GUNN, OF SAN FRANCISCO, CALIFORNIA

CONTROLLABLE AUXILIARY WING FOR AIRPLANES

Application filed September 19, 1928. Serial No. 306,825.

This invention relates to airplanes and particularly to a means for increasing the wing area when desired or necessary under certain conditions. The present invention has certain features in common with the auxiliary wing structure shown in my copending application for patent, Serial No. 299,365, filed August 13, 1928. This previous structure however was of a flexible nature and when once extended could not be retracted or folded until the airplane was resting on the ground. This device therefore, was useful solely for emergency purposes.

The principal object of the present invention is to provide a rigid auxiliary wing arranged not only to be extended at the will of the pilot, but to be retracted as well, irrespective as to whether the plane is in the air or on the ground. Further, the wing structure may be adjustably held at any point between its opposite limits of movement as the conditions at the time may require. The present apparatus therefore is not only valuable for emergency purposes, but for ordinary flying as well; since it will enable the pilot to take off into the air more quickly and easily than is at present the case, and which is of great advanatge with a heavy load, as well as enabling him to more accurately control his descent so as to facilitate and insure a safe landing.

The use of this device, therefore, will avoid such smash-ups and deaths as are now due to too rapid descent when close to the ground, and a consequent loss of accurate controlling of the machine when such control is most necessary.

The device also enables the plane to coast or glide for a greater length of time and with more safety than is at present the case, and will act to balance and stabilize the plane and maintain the same on an even keel under such conditions. The device therefore has the same emergency safety features as was the case with the previous structure.

At the same time when it is not needed the auxiliary wing may be easily retracted by the pilot at any time so that it then lies flat against the body of the main wing, and offers little resistance to the air.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 3 is a fragmentary side elevation of the airplane showing the auxiliary wing folded.

Fig. 4 is a fragmentary sectional elevation of the airplane with the auxiliary wing extended.

Fig. 5 is a fragmentary end view showing the guide means for the wing-control ram.

Fig. 6 is a fragmentary transverse section showing the auxiliary wing guide.

Fig. 7 is a perspective view of the cable control structure.

Figure 1:
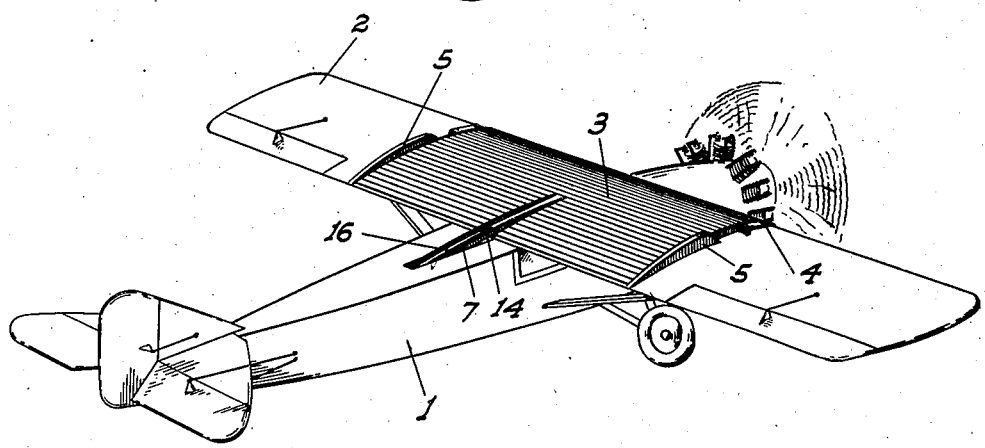
Fig. 1 is a perspective view from the rear of an airplane in flight, showing the auxiliary wing folded.
Figure 2:
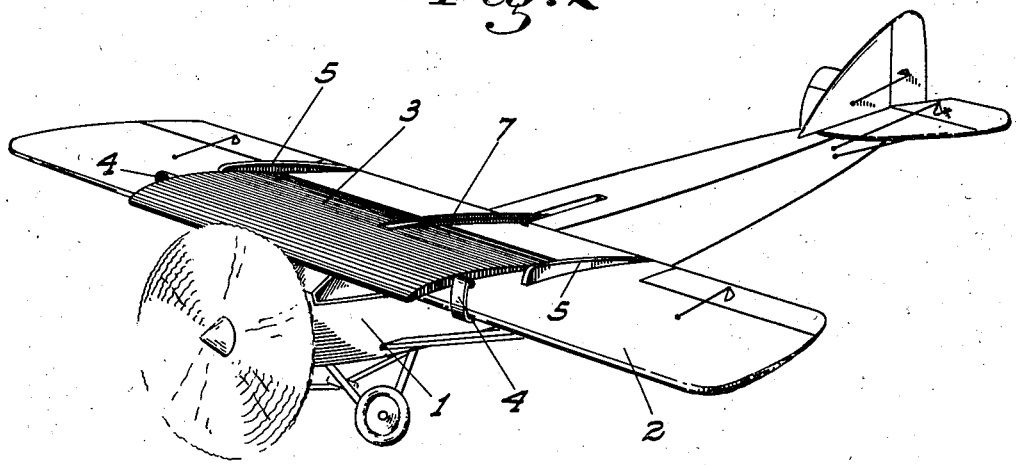
Fig. 2 is a similar view taken from the front showing the auxiliary wing extended.

Referring now more particularly to the characters of reference on the drawings, the numeral 1 denotes the body of an airplane of the monoplane type having a single main wing 2.

The auxiliary wing 3 is a rectangular member of suitable rigid construction, and normally rests flat on the main wing, extending substantially from the front to the rear edge thereof and being approximately one-third of the width or span of the main wing. The auxiliary wing is permanently secured to the main wing by rigid links 4, which are pivoted on the main wing at the front edge thereof and on the auxiliary wing at the sides and some distance from its front edge. If the auxiliary wing is shifted forward from its normal or folded position therefore, and the rear end is held adjacent the main wing, it will be seen that the front end will be raised as well as being moved forward and then ahead of the main wing, so that it lies at a forward angle to the latter as clearly shown in Fig. 4.

In order to guide and support the sides of the auxiliary wing against warping at its rear end and to limit the forward movement of said wing, longitudinal guide members 5 are mounted on the main wing and are engaged by rollers 6 or the like projecting from the sides of the auxiliary wing. These guides are preferably arranged so that when the auxiliary wing is extended to its foremost position, the rear end is spaced a short distance from the main wing, so as to allow of the passage of air between the wings and prevent the formation of blind air pockets.

The auxiliary wing is shifted forward and back at the will of the pilot by the following means:

Projecting rearwardly from the auxiliary wing, centrally of its width, is a rigid arm 7, to the outer end of which an endless cable 8 is attached. This cable extends forwardly into the pilot's compartment, extending thence rearwardly and about a pulley 10 fixed rearwardly of the rearmost position of the arm and then back to said arm. The rotation of the drum is controlled by a hand-wheel 11 connected thereto, a pawl and ratchet mechanism 12 normally prevent rotation of the drum in that direction such as would cause the wing to move rearwardly. This feature is necessary to hold the drum against rotation only in said one direction, since the wing tends to move back of itself when the plane is in flight and must be restrained from so doing without the necessity of the pilot maintaining a constant hold on the wheel. Owing to the constant air pressure against the auxiliary wing it will never of itself tend to move forwardly relative to the main wing as will be evident.

The arm 7 rides on a roller 13 mounted in the rear edge of the main wing, and preferably is engaged on its upper surface by rollers 14, mounted on an arm 15, projecting upwardly from the main wing, just ahead of the roller 13 and operating through a longitudinal slot 16 of the required length provided in the arm 7.

It will be noted that between its limits of movement, the angle of the auxiliary wing relative to the main wing is constantly altered, as will be obvious, since the movement of the auxiliary wing to any position is under the control of the pilot, the effectiveness of the auxiliary wing, governed largely by such angle, may be altered to suit different conditions.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. An auxiliary wing structure for airplanes including a rigid wing element superimposed and normally lying on the main wing, means for moving said element forwardly so that its forward edge extends ahead of the forward edge of the main wing, and means connecting said element to the main wing, in a manner to cause the element to assume an upwardly and forwardly angled position with such forward movement thereof.

2. An auxiliary wing structure for airplanes including a rigid wing element superimposed and normally lying on the main wing, means for moving said element forwardly so that its forward edge extends ahead of the forward edge of the main wing, and means connecting said element to the main wing, in a manner to cause the element to be forwardly and upwardly angled relative to the main wing with the forward movement of the element and in proportion to the extent of such movement.

3. An auxiliary wing structure for airplanes including a rigid wing element superimposed and normally lying on the main wing, links pivoted at one end on the main wing and extending thence rearwardly to pivotal connections with the auxiliary wing element, means for shifting the element forwardly from its normal position whereby the front end thereof will be also raised relative to the main wing, and guide means for the rear end of the element for preventing a similar raise thereof at that end.

4. A structure as in claim 3 in which said guide means is arranged to also limit the forward movement of the element.

In testimony whereof I affix my signature.

CHARLES H. GUNN.